(12) United States Patent
Portier et al.

(10) Patent No.: US 10,108,505 B2
(45) Date of Patent: *Oct. 23, 2018

(54) MOBILE AGENT BASED MEMORY REPLICATION

(71) Applicant: International Business Machines Corporation, Armonk, NY (US)

(72) Inventors: Bertrand H. Portier, Austin, TX (US); Suraj Shinde, Metepec (MX)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/011,746

(22) Filed: Feb. 1, 2016

(65) Prior Publication Data

US 2016/0147621 A1 May 26, 2016

Related U.S. Application Data

(63) Continuation of application No. 14/163,558, filed on Jan. 24, 2014, now Pat. No. 9,304,877.

(51) Int. Cl.
*G06F 11/20* (2006.01)
*G06F 17/30* (2006.01)
*G06F 11/07* (2006.01)

(52) U.S. Cl.
CPC ........ *G06F 11/2007* (2013.01); *G06F 11/079* (2013.01); *G06F 11/0709* (2013.01);
(Continued)

(58) Field of Classification Search
CPC .............. G06F 11/203; G06F 11/2035; G06F 11/0709; G06F 11/079; G06F 11/2007;
(Continued)

(56) References Cited

U.S. PATENT DOCUMENTS 6,912,569 B1 6/2005 Sharma et al.
7,246,256 B2 7/2007 De La Cruz et al.
(Continued)

FOREIGN PATENT DOCUMENTS

WO 2005106668 A1 11/2005
WO 2011106067 A1 9/2011

OTHER PUBLICATIONS

Reilly, D., "Mobile Agents—Process migration technology and its implications". [Online] [Retrieved on: Nov. 13, 2013], 6 pages, <http://www.davidreilly.com/topics/software_agents/mobile_agents/>.

(Continued)

*Primary Examiner* — Nadeem Iqbal
(74) *Attorney, Agent, or Firm* — Christopher K. McLane

(57) ABSTRACT

Embodiments of the present invention disclose a method, computer program product, and system for memory replication. In one embodiment, in accordance with the present invention, the computer implemented method includes the steps of executing a mobile agent on a server node, wherein the server node is within a cluster of server nodes connected via network communications, capturing a memory state of the server node during operation of the server node, which is captured and stored by the mobile agent, monitoring the server node to determine whether the server node has failed, and responsive to determining that the server node has failed, migrating the mobile agent to an active server node within the cluster of server nodes, wherein the mobile agent carries the captured memory state.

20 Claims, 3 Drawing Sheets

(52) U.S. Cl.
CPC ........ *G06F 11/203* (2013.01); *G06F 11/2048* (2013.01); *G06F 17/30575* (2013.01); *G06F 11/2035* (2013.01); *G06F 2201/85* (2013.01)

(58) Field of Classification Search
CPC ............. G06F 11/2046; G06F 11/2048; G06F 11/0793; G06F 11/2028; G06F 11/1456; G06F 11/2041; H04L 41/0663; H04L 41/5012; H04L 41/0659
See application file for complete search history.

(56) References Cited

U.S. PATENT DOCUMENTS

| | | | | |
|---|---|---|---|---|
| 7,320,088 | B1* | 1/2008 | Gawali | G06F 11/1662 709/219 |
| 7,536,586 | B2* | 5/2009 | Ahmadian | G06F 11/2046 711/114 |
| 7,788,524 | B2 | 8/2010 | Wing et al. | |
| 8,108,455 | B2 | 1/2012 | Yeager et al. | |
| 8,296,599 | B1* | 10/2012 | Boyer | G06F 11/203 714/4.11 |
| 8,413,145 | B2* | 4/2013 | Chou | G06F 11/1484 711/112 |
| 9,304,877 | B2* | 4/2016 | Portier | G06F 11/203 |
| 9,319,282 | B2* | 4/2016 | Keane | H04L 67/1002 |
| 2007/0174657 | A1* | 7/2007 | Ahmadian | G06F 11/2053 714/6.21 |
| 2008/0082652 | A1 | 4/2008 | Gates et al. | |
| 2009/0138541 | A1* | 5/2009 | Wing | G06F 11/2025 709/201 |
| 2011/0225285 | A1 | 9/2011 | Patel et al. | |
| 2013/0212425 | A1* | 8/2013 | Blaine | G06F 11/3648 714/6.1 |
| 2014/0215172 | A1 | 7/2014 | Tsirkin | |

OTHER PUBLICATIONS

"Configuring High Availability Session Persistence and Failover". Oracle GlassFish Server High Availability Administration Guide. Release 3.1.2. Part No. E24934-01. [Online] [Retrieved on: Nov. 1, 2013], 12 pages, <http://docs.oracle.com/cd/E26576_01/doc.312/e24934/session-persistence-and-failover.htm>.

"Overview—Welcome to Ellipsis!", 1 page, [Online] [Retrieved on: Nov. 13, 2013], <http://www.ellipsis.me/>.

"Setting up node replication and failover for the cluster". IBM Lotus Sametime 8.5.1 information center. [Online] [Retrieved on: Nov. 1, 2013], 2 pages, <http://pic.dhe.ibm.com/infocenter/sametime/v8r5/topic/com.ibm.help.sam . . . >.

"Welcome to the IBM Lotus Sametime 8.5.1 information center". IBM Lotus Sametime 8.5.1 information center. [Online] [Retrieved on: Nov. 1, 2013]. Last updated: Nov. 22, 2010. Copyright IBM Corporation 2000, 2010. <http://pic.dhe.ibm.com/infocenter/sametime/v8r5/topic/com.ibm.help.sam . . . >, 3 pages.

Portier et al., "Mobile Agent Based Memory Replication", U.S. Appl. No. 14/163,558, filed Jan. 24, 2014, 28 pages.

* cited by examiner

MOBILE AGENT BASED MEMORY REPLICATION

FIELD OF THE INVENTION

The present invention relates generally to the field of memory replication, and more particularly to mobile agent based memory replication.

BACKGROUND OF THE INVENTION

Replication involves sharing data so as to ensure consistency between redundant resources (e.g., hardware and software components), which can improve reliability, fault-tolerance, and accessibility. For example, data replication can occur between memories of server nodes, which can be in a cluster of server nodes. A server cluster includes a series of server nodes that are connected via a network. Some existing types of state replication for clusters of server nodes include: database persistence, synchronous memory replication, and asynchronous memory replication. In database persistence, the memory state is persisted to a database, and if a node fails, then another node can read the memory state from the database and continue the work. In synchronous memory replication, for any update to the memory state, the updated state is written to the memory of the server node. In asynchronous replication, at a given interval, the memory state is replicated.

A mobile agent is a software program that has the capability to migrate from one server node to another server node, within a cluster of server nodes. Mobile agents can directly interact with resources of each server node (e.g., memory) and can migrate from one server node to another server node, carrying along state information and continuing to execute on the new server node.

SUMMARY

Embodiments of the present invention disclose a method, computer program product, and system for memory replication. In one embodiment, in accordance with the present invention, the computer implemented method includes the steps of executing a mobile agent on a server node, wherein the server node is within a cluster of server nodes connected via network communications, capturing a memory state of the server node during operation of the server node, which is captured and stored by the mobile agent, monitoring the server node to determine whether the server node has failed, and responsive to determining that the server node has failed, migrating the mobile agent to an active server node within the cluster of server nodes, wherein the mobile agent carries the captured memory state. In another embodiment, the method further includes the step of transferring the captured memory state from the mobile agent to computer memory of the active server node.

DETAILED DESCRIPTION

Figure 1:
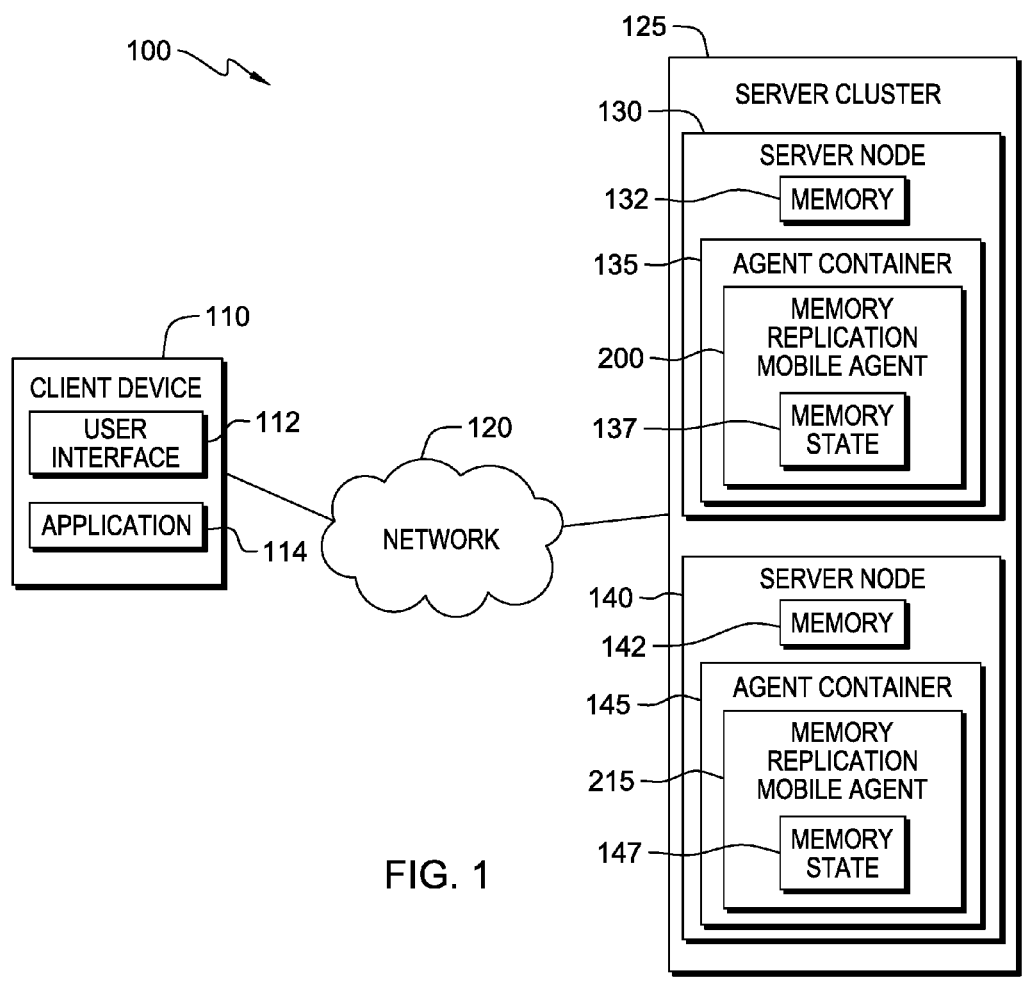
FIG. 1 is a functional block diagram of a data processing environment in accordance with an embodiment of the present invention.

Embodiments of the present invention allow for replication of a memory state from one server node to another server node, within a cluster of server nodes. A mobile agent is able to detect the failure of a server node, and migrate to an active server node. The memory state of the failing server node is migrated and transferred to the active server node.

Embodiments of the present invention recognize that existing types of state replication for clusters of server nodes include: database persistence, synchronous memory replication, and asynchronous memory replication. Database persistence can be resource intensive, and therefore incur associated costs and delays. Synchronous replication involves keeping all server nodes in the cluster in the same state, which can negatively impact performance. Asynchronous replication is periodic, and therefore a possibility of a loss of state information exists. With existing solutions, a trade-off exists between application performance and fault tolerance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

An embodiment of data processing environment 100 includes client device 110, and server cluster 125, which includes server nodes 130 and 140, all interconnected over network 120. In an example embodiment, client device 110 can communicate with server cluster 125, having data (e.g., session information) stored on respective memories of server nodes 130 and 140 (e.g., memory 132 and 142). For example, during an online shopping transaction, memory 132 of server node 130 stores information corresponding to the content of the shopping cart of client device 110 (i.e., session information of client device 110).

In various embodiments of the present invention, client device 110 may be a workstation, personal computer, personal digital assistant, mobile phone, or any other device capable of executing program instructions in accordance with embodiments of the present invention. In general, client device 110 is representative of any electronic device or combination of electronic devices capable of executing machine-readable program instructions, as described in greater detail with regard to FIG. 3, in accordance with embodiments of the present invention. Client device 110 includes user interface 112 and application 114. User interface 112 accepts input from individuals utilizing client device 110. In example embodiments, an individual (through input via user interface 112) utilizing client device 110 can utilize application 114 to communicate with server nodes 130 and 140, via network 120. In an example, application 114 can be a web browser that can be utilized for online shopping transactions.

In one embodiment, client device 110 and server nodes 130 and 140 (i.e., server cluster 125) communicate through network 120. Network 120 can be, for example, a local area network (LAN), a telecommunications network, a wide area network (WAN) such as the Internet, or a combination of the three, and include wired, wireless, or fiber optic connections. In general, network 120 can be any combination of connections and protocols that will support communications between client device 110, and server nodes 130 and 140 in accordance with embodiments of the present invention.

In one embodiment, server nodes 130 and 140 are a series of servers (i.e., server cluster 125) that are connected via network 120. Components of a server cluster 125 (i.e., server nodes 130 and 140) are traditionally connected through network communications (i.e., network 120), with each server node running a respective instance of an operating system. Server nodes 130 and 140, within server cluster 125, communicate and work together, so that in various embodiments, the server nodes can be viewed as a single server system. In example embodiments, server nodes 130 and 140 can be desktop computers, computer servers, or any other computer systems known in the art capable of performing functions in accordance with embodiments of the present invention. In certain embodiments, server nodes 130 and 140 represent computer systems utilizing clustered computers and components (e.g., database server computers, application server computers, etc.), that act as a single pool of seamless resources when accessed by elements of data processing environment 100 (e.g., client device 110). In general, server nodes 130 and 140 are representative of any electronic device or combination of electronic devices capable of executing machine-readable program instructions, as described in greater detail with regard to FIG. 3, in accordance with embodiments of the present invention. In various embodiments, server nodes 130 and 140 within server cluster 125 can include application server nodes within a cluster of application servers (e.g., for memory replication), database nodes within a cluster of databases (e.g., for database replication), and operating system nodes within a cluster of operating systems (e.g., for file replication).

In one embodiment, server nodes 130 and 140 include respective instances of memory 132 and 142. In example embodiments, memory 132 and 142 can include random access memory (RAM) 314 and cache memory 316 (discussed in further detail with regard to FIG. 3). In general, memory 132 and 142 can include any suitable volatile or non-volatile computer-readable storage media. Memory 132 and 142 of respective server nodes 130 and 140 can store data that corresponds to communications between client device 110 and the server nodes (e.g., session information). For example, during an online shopping transaction, memory 132 of server node 130 stores information corresponding to the content of the shopping cart of client device 110, and other information corresponding to the client device (i.e., session information of client device 110).

In an embodiment, server nodes 130 and 140 include respective instances of agent containers 135 and 145, which include respective instances of memory replication mobile agent 200 and 215. In one embodiment, agent containers 135 and 145 have the capability to load or clone a mobile agent (e.g., memory replication mobile agents 200 and 215) onto server nodes 130 and 140. Agent containers 135 and 145 can clone and add mobile agents dynamically to server nodes 130 and 140, during operation of the server nodes. In another embodiment, an instance of agent containers 135 and 145 are present on each respective server node 130 and 140. While operating on server nodes 130 or 140, agent containers 135 and 145 provide the server nodes with a runtime environment and software framework that allow mobile agents to operate. Agent containers 135 and 145 exist on respective instances of server nodes 130 and 140, and can create mobile agents (e.g., memory replication mobile agents 200 and 215) corresponding to user (e.g., client device 110) sessions on server cluster 125.

Memory replication mobile agents 200 and 215 are software programs that have the capability to migrate from one server node to another server node (e.g., from server node 130 to server node 140), within a cluster of server nodes (i.e., server cluster 125). In an example embodiment, memory replication mobile agents 200 and 215 are capable of monitoring a memory state of a server node that the mobile agent is present on (e.g., server nodes 130 and 140). In various embodiments, memory replication mobile agents 200 and 215 are software programs that can automatically complete tasks, not only at an originating location (e.g., server node 130), but even after moving to other positions (e.g., server node 140). Memory replication mobile agents 200 and 215 can operate on a runtime environment and software framework provided by agent container 135 or 145. For example, memory replication mobile agents 200 and 215 are state migration mobile agents that operate within a framework for running mobile agents on server nodes (e.g., agent containers 135 and 145 within respective server nodes 130 and 140). In example embodiments, an itinerary of memory replication mobile agents 200 and 215 is set to migrate to other server nodes within server cluster 125.

In an example embodiment, memory replication mobile agents 200 and 215 migrate and transfer memory states (i.e., memory states 137 and 147) between server nodes, in accordance with embodiments of the present invention. In various embodiments, memory states 137 and 147 are the stored, most recent, memory state of the memory of the server node where the respective instance of memory replication mobile agent 200 or 215 is operating (e.g., memory 132 on server node 130). Memory states 137 and 147 include session or state data that is stored in respective instances of memory 132 and 142. Memory replication mobile agent 200 and 215 makes sure that the respective instance of memory state 137 and 147 is the most up to date memory state of memory 132 and 142, respectively. For example, in an internet shopping session, memory state 137 can include information on the contents of the shopping cart (e.g., session information of client device 110).

In various embodiments, each server node (server nodes 130 and 140) can have one or more respective instances of mobile agent (memory replication mobile agents 200 and 215). In an example embodiment, the number of mobile agents in the server cluster 125 (server nodes 130 and 140) corresponds to the number of user sessions on the server cluster (i.e., an agent corresponding to each user). For example, agent container 135 on server node 130 includes a certain number of instances of memory replication mobile agent 200. If the number of user sessions on server node 130 is greater than the number of instances of memory replication mobile agent 200, then agent container 135 deploys additional instances of memory replication mobile agent 200 (until an instance of the memory replication mobile agent corresponds to each user session).

Figure 2:
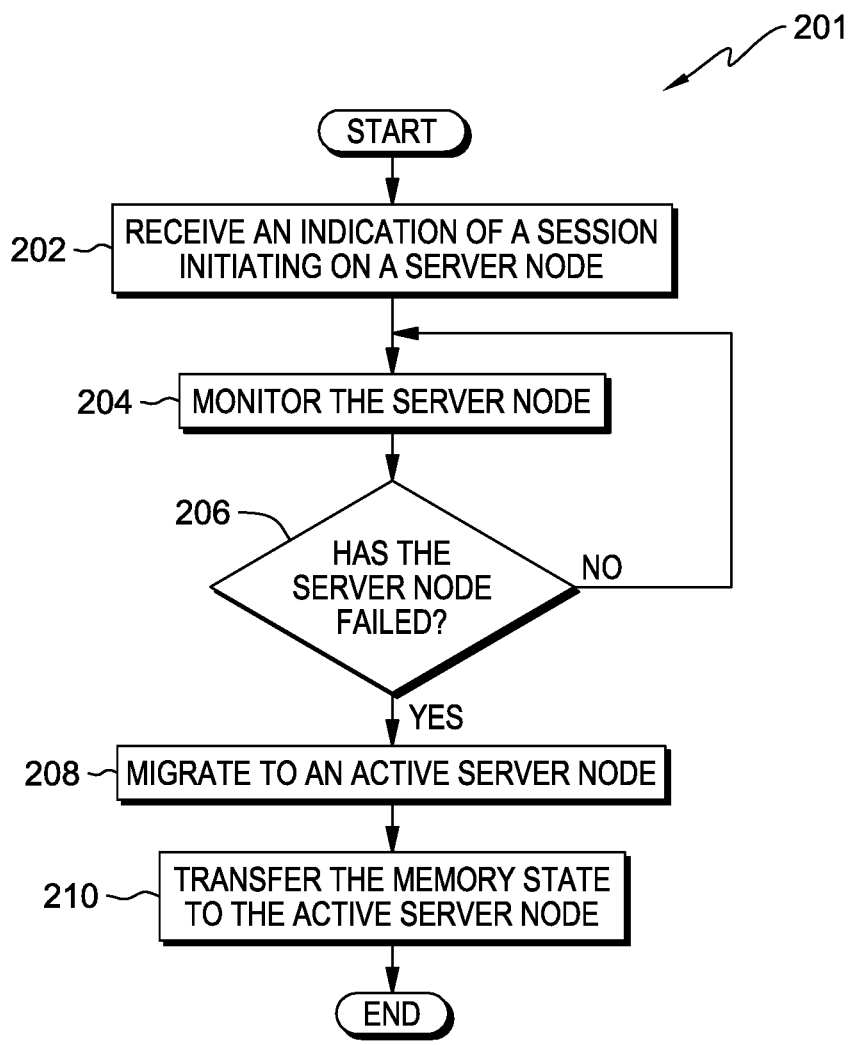
FIG. 2 is a flowchart depicting operational steps of a program for migrating and transferring data between server nodes, in accordance with an embodiment of the present invention.

FIG. 2 is flowchart 201 depicting operational steps of memory replication mobile agent 200 in accordance with an embodiment of the present invention. In one embodiment, memory replication mobile agent 200 operates on agent container 135, monitoring memory 132 on server node 130. In other embodiments, operational steps of FIG. 2 are a general depiction of operation of a memory replication mobile agent, and can also depict operation of memory replication mobile agent 215, operating on agent container 145 and monitoring memory 142 on server node 140.

In step 202, memory replication mobile agent 200 receives an indication of a session initiating on a server node. In one embodiment, responsive to client device 110 initiating a session on server node 130, agent container 135 deploys memory replication mobile agent 200 on the server node. Memory replication mobile agent 200 operates continuously during communication between client device 110 and server node 130. In various embodiments, memory replication mobile agent 200 starts running at the time that a server node (e.g., server node 130 or 140) starts running, and continues to run during operation of the server node. In another embodiment, if memory replication mobile agent 200 is operating on a server node without an association with a user session, then, responsive to client device 110 initiating a session on server node 130, then agent container 135 associates the memory replication mobile agent with the session of the client device.

In step 204, memory replication mobile agent 200 monitors the server node. In one embodiment, memory replication mobile agent 200 monitors the server node that the memory replication mobile agent is hosted on (i.e., server node 130), within the server cluster 125. Memory replication mobile agent 200 continuously monitors the respective server node (i.e., server node 130), during the entirety of the session of client device 110, or operation of the server node. In an example embodiment, memory replication mobile agent 200 is continuously capturing the updated memory state of memory 132 on server node 130, and storing the most current memory state as memory state 137. In various embodiments, if the memory of a server node is updated (e.g., memory 132 of server node 130), then memory replication mobile agent 200 captures and stores the updated memory state as memory state 137. In one example, client device 110 is utilizing server node 130 to perform an internet shopping transaction. During the online shopping transaction, memory 132 of server node 130 contains information on the contents of the shopping cart of client device 110 (i.e., the session information). In this example, memory replication mobile agent 200 captures and stores the memory state information in memory 132 as memory state 137. Each time that information in memory 132 is updated (e.g., contents of shopping cart updated), memory replication mobile agent 200 captures an updated memory state 137 corresponding to the information in the memory.

In decision step 206, memory replication mobile agent 200 determines whether the server node has failed. In one embodiment, memory replication mobile agent 200 monitors the respective server node of the mobile agent (e.g., server node 130) for a "heartbeat." A heartbeat of a server node is an indication that the server node is currently active and operating. Responsive to determining that the server node has not failed (decision step 206, "no" branch), memory replication mobile agent 200 continues to monitor the server node (repeats step 204).

In step 208, memory replication mobile agent 200 migrates to an active server node. In one embodiment, responsive to determining that the server node has failed (decision step 206, "yes" branch), memory replication mobile agent 200 migrates, including memory state 137, to an active server node (e.g., server node 140). Memory replication mobile agent 200 migrates to the agent container of an active server node in the server cluster 125. Memory state 137 includes the stored, most currently updated, memory state of the memory of a server node (e.g., memory 132 of server node 130). In an example embodiment, responsive to determining that the server node that memory replication mobile agent 200 is operating on has failed (i.e., server node 130), memory replication mobile agent 200 identifies an active server node within the cluster of server nodes (i.e., server nodes 130 and 140 within server cluster 125). Responsive to identifying an active server node, memory replication mobile agent 200 migrates, including memory state 137, to the agent container of the identified active server node (i.e., agent container 145 on server node 140).

In step 210, memory replication mobile agent 200 transfers the memory state to the active server node. In one embodiment, memory replication mobile agent 200 transfers memory state 137 (migrated in step 208) to the memory of the identified active server node (migrated to in step 208). Memory state 137, which is the stored, most currently updated memory state of the original server node of memory replication mobile agent 200, is stored on the memory of the identified active server node (of step 208). In an example embodiment, transferring memory state 137 to memory of an active server node allows client device 110 to continue the session (e.g., online shopping transaction or other communications) with server cluster 125 after the original server node has failed.

In the previously discussed example with regard to the internet shopping transaction, responsive to determining that server node 130 has failed (decision step 206, "yes" branch), memory replication mobile agent 200 identifies server node 140 as an active server node. Memory replication mobile agent 200 then migrates, including memory state 137, to agent container 145 on server node 140. Memory state 137 includes the most current session information corresponding to client device 110 (e.g., contents of shopping cart, etc.), which was previously stored on memory 132 of server node 130 (before the server node failed). Memory replication mobile agent 200 then transfers memory state 137 to memory 142 of server node 140, storing the most current session information of client device 110 to the memory, and allowing client device to continue the internet shopping transaction.

Figure 3:
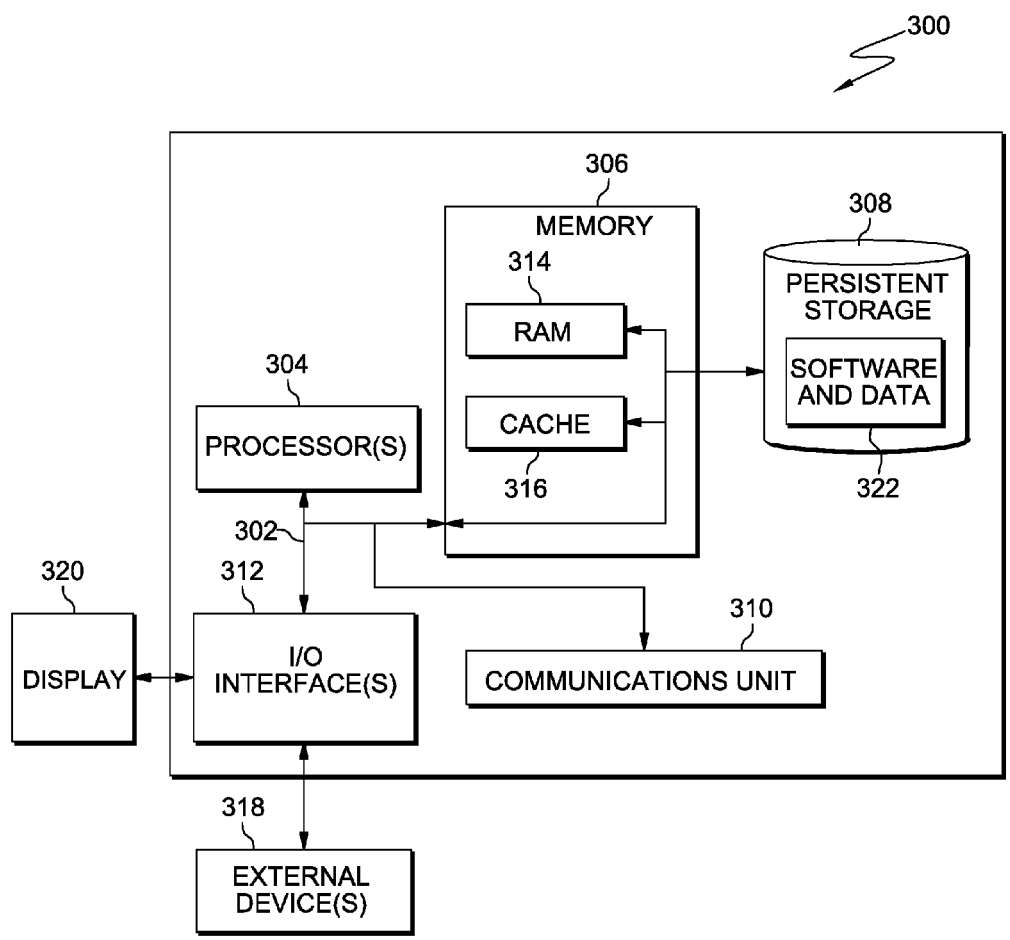
FIG. 3 depicts a block diagram of components of the computing system of FIG. 1 in accordance with an embodiment of the present invention.

FIG. 3 depicts a block diagram of components of computer 300, which is representative of client device 110, and server nodes 130 and 140 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are examples of computer-readable tangible storage devices. A storage device is any piece of hardware that is capable of storing information, such as, data, program code in functional form, and/or other suitable information on a temporary basis and/or permanent basis. In this embodiment, memory 306 includes random access memory (RAM) 314 and cache memory 316. In general, memory 306 can include any suitable volatile or non-volatile computer-readable storage device. Software and data 322 are stored in persistent storage 308 for access and/or execution by processors 304 via one or more memories of memory 306. With respect to client device 110, software and data 322 represents application 114. With respect to server node 130, software and data 322 represents agent container 135 and memory replication mobile agent 200. With respect to server node 140, software and data 322 represents agent container 145 and memory replication mobile agent 215.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data 322 can be stored on such portable computer-readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for memory replication, the method comprising the steps of:
    executing a mobile agent on a server node, wherein the mobile agent is within a container and the server node is within a cluster of server nodes connected via network communications;
    capturing a memory state of the server node during operation of the server node, which is captured and stored by the mobile agent within the container;
    monitoring the server node to determine whether the server node has failed; and
    responsive to determining that the server node has failed, migrating the mobile agent to an active server node within the cluster of server nodes, wherein the mobile agent carries the captured memory state.

2. The method in accordance with claim 1, further comprising the step of:
    transferring the captured memory state from the mobile agent to computer memory of the active server node.

3. The method in accordance with claim 1, wherein the mobile agent starts executing when the server node starts operating, and executes during operation of the server node.

4. The method in accordance with claim 1, wherein the step of monitoring the server node to determine whether the server node has failed, further comprises the steps of:
    monitoring the server node for a heartbeat, wherein the heartbeat is an indication that the server node is active and operating; and
    responsive to a failure of detecting a heartbeat from the server node, determining that the server node is not active and has failed.

5. The method in accordance with claim 1, wherein the step of migrating the mobile agent to an active server node within the cluster of server nodes, further comprises the steps of:
    identifying an active server node within the cluster of server nodes; and
    migrating the mobile agent, including the captured memory state, to the identified active server node, wherein the mobile agent migrates to an agent container included on the identified active server node.

6. The method in accordance with claim 1,
    wherein the mobile agent is a state migration agent operating within a framework for running mobile agents on server nodes, and
    wherein an itinerary of the mobile agent is set to migrate to other server nodes within the cluster of server nodes.

7. The method in accordance with claim 1, wherein the server node within the cluster of server nodes includes an application server node within a cluster of application server nodes, a database node within a cluster of databases, and an operating system node within a cluster of operating systems.

8. A computer program product for memory replication, including one or more computer-readable storage media and program instructions stored on at least one of the one or more storage media, wherein execution of the program instructions by one or more processors of a computer system causes the one or more processors to carry out the acts of:
    executing a mobile agent on a server node, wherein the mobile agent is within a container and the server node is within a cluster of server nodes connected via network communications;
    capturing a memory state of the server node during operation of the server node, which is captured and stored by the mobile agent within the container;
    monitoring the server node to determine whether the server node has failed; and
    responsive to determining that the server node has failed, migrating the mobile agent to an active server node within the cluster of server nodes, wherein the mobile agent carries the captured memory state.

9. The computer program product in accordance with claim 8, wherein execution of the program instructions by the one or more processors of the computer system causes the one or more processors to carry out the additional act of:
    transferring the captured memory state from the mobile agent to computer memory of the active server node.

10. The computer program product in accordance with claim 8, wherein the mobile agent starts executing when the server node starts operating, and executes during operation of the server node.

11. The computer program product in accordance with claim 8, wherein program instructions for monitoring the server node to determine whether the server node has failed further comprises program instructions to carry out the additional acts of:
    monitoring the server node for a heartbeat, wherein the heartbeat is an indication that the server node is active and operating; and
    responsive to a failure of detecting a heartbeat from the server node, determining that the server node is not active and has failed.

12. The computer program product in accordance with claim 8, wherein program instructions for migrating the mobile agent to an active server node within the cluster of server nodes further comprises program instructions to carry out the additional acts of:
- identifying an active server node within the cluster of server nodes; and
- migrating the mobile agent, including the captured memory state, to the identified active server node,
- wherein the mobile agent migrates to an agent container included on the identified active server node.

13. The computer program product in accordance with claim 8,
- wherein the mobile agent is a state migration agent operating within a framework for running mobile agents on server nodes, and
- wherein an itinerary of the mobile agent is set to migrate to other server nodes within the cluster of server nodes.

14. The computer program product in accordance with claim 8, wherein the server node within the cluster of server nodes includes an application server node within a cluster of application server nodes, a database node within a cluster of databases, and an operating system node within a cluster of operating systems.

15. A computer system for memory replication, the computer system comprising:
- one or more computer processors;
- one or more computer-readable storage media; and
- program instructions stored on the computer-readable storage media for execution by at least one of the one or more processors, the program instructions comprising:
- program instructions to execute a mobile agent on a server node, wherein the mobile agent is within a container and the server node is within a cluster of server nodes connected via network communications;
- capturing a memory state of the server node during operation of the server node, which is captured and stored by the mobile agent within the container;
- program instructions to monitor the server node to determine whether the server node has failed; and
- responsive to determining that the server node has failed, program instructions to migrate the mobile agent to an active server node within the cluster of server nodes, wherein the mobile agent carries the captured memory state.

16. The computer system of claim 15, further comprising program instructions to: transfer the captured memory state from the mobile agent to computer memory of the active server node.

17. The computer system of claim 15, wherein the mobile agent starts executing when the server node starts operating, and executes during operation of the server node.

18. The computer system of claim 15, wherein the program instructions to monitor the server node to determine whether the server node has failed, further comprise program instructions to:
- monitor the server node for a heartbeat, wherein the heartbeat is an indication that the server node is active and operating; and
- responsive to a failure of detecting a heartbeat from the server node, determine that the server node is not active and has failed.

19. The computer system of claim 15, wherein the program instructions to migrate the mobile agent to an active server node within the cluster of server nodes, further comprise program instructions to:
- identify an active server node within the cluster of server nodes; and
- migrate the mobile agent, including the captured memory state, to the identified active server node,
- wherein the mobile agent migrates to an agent container included on the identified active server node.

20. The computer system of claim 15,
- wherein the mobile agent is a state migration agent operating within a framework for running mobile agents on server nodes, and
- wherein an itinerary of the mobile agent is set to migrate to other server nodes within the cluster of server nodes.

\* \* \* \* \*